United States Patent
Friedli

(10) Patent No.: US 11,238,684 B2
(45) Date of Patent: Feb. 1, 2022

(54) ACCESS CONTROL SYSTEM FOR RADIO AND FACIAL RECOGNITION

(71) Applicant: INVENTIO AG, Hergiswil (CH)

(72) Inventor: Paul Friedli, Remetschwil (CH)

(73) Assignee: Inventio AG

( * ) Notice: Subject to any disclaimer, the term of this patent is extended or adjusted under 35 U.S.C. 154(b) by 35 days.

(21) Appl. No.: 16/603,932

(22) PCT Filed: Mar. 28, 2018

(86) PCT No.: PCT/EP2018/057968
§ 371 (c)(1),
(2) Date: Oct. 9, 2019

(87) PCT Pub. No.: WO2018/188956
PCT Pub. Date: Oct. 18, 2018

(65) Prior Publication Data
US 2020/0126337 A1    Apr. 23, 2020

(30) Foreign Application Priority Data
Apr. 10, 2017    (EP) .................................... 17165812

(51) Int. Cl.
*G07C 9/25*    (2020.01)
*G06K 9/00*    (2006.01)
*G07C 9/27*    (2020.01)

(52) U.S. Cl.
CPC ......... *G07C 9/253* (2020.01); *G06K 9/00288* (2013.01); *G07C 9/27* (2020.01)

(58) Field of Classification Search
CPC .......... G07C 9/253; G07C 9/27; G07C 9/257; G07C 2209/04; G06K 9/00288; B66B 2201/4638; B66B 1/468
(Continued)

(56) References Cited

U.S. PATENT DOCUMENTS 5,012,522 A    4/1991    Lambert
5,432,864 A    7/1995    Lu et al.
(Continued)

FOREIGN PATENT DOCUMENTS

CN    105654584 A    6/2016
CN    106296920 A    1/2017
(Continued)

OTHER PUBLICATIONS

Konen et al., "ZN-Face: A system for access control using automated face recognition" Zentrum fur Neuroinformatik GmbH, Bochum, Germany, Mar. 2008, 6 Pages.
(Continued)

*Primary Examiner* — Nam V Nguyen
(74) *Attorney, Agent, or Firm* — Bressler, Amery and Ross; Pierre R. Yanney

(57) ABSTRACT

An access control system receives a device-specific identifier of a mobile electronic device. A memory device stores the identifier as belonging to a user present in a public zone. An image processing device generates from a camera image produced by a camera a real-time template for facial features of the user present when the user present requests access to an access-restricted zone, and searches user profiles stored in a database for a reference template that matches the real-time template to a specified degree, wherein a user profile is searched only if it is assigned to a present user based on a stored identifier, wherein in the case of a match, the system grants the user access to the access-restricted zone and denies access when there is no match.

17 Claims, 3 Drawing Sheets

(58) Field of Classification Search
USPC .......... 340/5.53, 5.5; 382/115, 118; 235/382
See application file for complete search history.

(56) References Cited

U.S. PATENT DOCUMENTS

| | | | |
|---|---|---|---|
| 6,690,673 B1* | 2/2004 | Jarvis | G07C 9/27 |
| | | | 370/401 |
| 6,725,383 B2* | 4/2004 | Kyle | G07C 9/38 |
| | | | 726/7 |
| 6,971,029 B1 | 11/2005 | Avery et al. | |
| 6,972,660 B1* | 12/2005 | Montgomery, Jr. | G07C 9/37 |
| | | | 340/5.52 |
| 6,999,606 B1 | 2/2006 | Frischholz | |
| 7,079,669 B2 | 7/2006 | Hashimoto et al. | |
| 7,079,699 B2 | 7/2006 | Nagahashi | |
| 7,212,655 B2 | 5/2007 | Tumey et al. | |
| 7,362,210 B2* | 4/2008 | Bazakos | G07B 15/063 |
| | | | 340/5.53 |
| 7,735,728 B2* | 6/2010 | Wallerstorfer | G07C 9/253 |
| | | | 235/382 |
| 8,438,110 B2* | 5/2013 | Calman | G06Q 40/02 |
| | | | 705/44 |
| 8,646,686 B2* | 2/2014 | Bullwinkel | G07C 9/27 |
| | | | 235/380 |
| 8,779,889 B2* | 7/2014 | Bayne | G07C 9/15 |
| | | | 340/5.2 |
| 9,055,050 B2* | 6/2015 | Gupta | H04L 63/08 |
| 9,552,684 B2* | 1/2017 | Bacco | H04L 63/107 |
| 9,753,952 B2* | 9/2017 | Anegawa | H04N 7/188 |
| 10,457,521 B2* | 10/2019 | Legeret | B66B 5/025 |
| 10,850,709 B1* | 12/2020 | Nagata | B60R 25/25 |
| 10,965,837 B2* | 3/2021 | Nobutani | G06K 9/00288 |
| 2005/0110610 A1 | 5/2005 | Bazakos et al. | |
| 2006/0158307 A1* | 7/2006 | Lee | G06K 9/00221 |
| | | | 340/5.53 |
| 2010/0282839 A1 | 11/2010 | Zura et al. | |
| 2014/0085050 A1* | 3/2014 | Luna | G07C 9/37 |
| | | | 340/5.82 |
| 2014/0344896 A1 | 11/2014 | Pak et al. | |
| 2015/0015365 A1 | 1/2015 | Ortiz et al. | |
| 2015/0221151 A1 | 8/2015 | Bacco et al. | |
| 2015/0341599 A1 | 11/2015 | Carey | |

FOREIGN PATENT DOCUMENTS

| | | |
|---|---|---|
| CN | 106373233 A | 2/2017 |
| EP | 0082304 A1 | 6/1983 |
| EP | 0664037 B1 | 12/2001 |
| EP | 1475754 A1 | 11/2004 |
| EP | 2051486 A2 | 4/2009 |
| EP | 2407930 A1 | 1/2012 |
| EP | 2677465 A1 | 12/2013 |
| WO | 97/34251 A1 | 9/1997 |
| WO | 2004010365 A2 | 1/2004 |
| WO | 2005045769 A1 | 5/2005 |
| WO | 2010112586 A1 | 10/2010 |
| WO | 2015034459 A1 | 3/2015 |
| WO | 2016198548 A1 | 12/2016 |

OTHER PUBLICATIONS

"Gesichtserkennung" ["Facial Recognition"] German Federal Office for Information Security, retrieved from https://www.bsi.bund.de/DE/Themen/DigitaleGesellschaft/Biometrie/BiometrischeVe on Jan. 27, 2017, 20 Pages [with machine translation and hand annotated drawings].

* cited by examiner

ACCESS CONTROL SYSTEM FOR RADIO AND FACIAL RECOGNITION

CROSS-REFERENCE TO RELATED APPLICATIONS

This application is the national phase application under 35 U.S.C. § 371 claiming the benefit of priority based on International Patent Application No. PCT/EP2018/057968, filed on Mar. 28, 2018, which claims the benefit of priority based on European Patent Application No. 17165812.3, filed on Apr. 10, 2017. The contents of each of these applications are herein incorporated by reference.

FIELD OF THE INVENTION

The technology described herein generally relates to an access control system that grants an authorized user access to an access-restricted zone in a building or site. Exemplary embodiments of the technology relate, in particular, to an access control system having a transmitting and receiving device and a method for operating such an access control system.

BACKGROUND OF THE INVENTION

Access control systems may be designed in a variety of different ways. For example, U.S. Pat. No. 9,077,716 describes an access control system, in which a mobile electronic device communicates with an electronic door lock by means of a Bluetooth or WLAN radio link and with a web server by means of a WAN (Wide Area Network) radio link to open the electronic lock. For this purpose, the mobile electronic device sends its device identifier and a user-entered identifier of the electronic lock to the web server, which checks the access authorization and sends a response to the mobile device consisting of a lock command, the lock identifier and a code pattern. The mobile device sends the lock command and the code pattern to the electronic lock. The lock is opened if it recognizes the lock command and the code pattern as valid.

WO 2010/112586 A1 describes an access control system, in which a mobile telephone carried by a user sends an identification code to an access node. If the identification code is recognized as valid, the access node sends an access code to the mobile phone, which displays the access node on a display. If the user holds the mobile phone to a camera so that it can detect the displayed access code, the access control system checks whether the detected access code is valid. If valid, access will be granted to the user.

These access control systems provide a degree of user-friendliness, because users do not carry authorization credentials or conventional keys and do not need to remember an access code. Instead, the mobile electronic device, which many users already carry for communication purposes anyway, provides the function of an authorization credential or key. Despite the use of mobile devices, these access control systems require users to handle the mobile devices. There is therefore a need for a different, more user-friendly technology.

SUMMARY OF THE INVENTION

One aspect of such a technology relates to a system for controlling access to an access-restricted zone in a building or site. The system comprises a transmitting and receiving device, a memory device and an image processing device. The transmitting and receiving device is designed to receive a device-specific identifier of a mobile electronic device. The memory device stores the identifier of the mobile electronic device received by the transmitting and receiving device as belonging to a user present in a public zone. The memory device contains a database, in which a plurality of user profiles of authorized users is created. The image processing device generates from a camera image produced by a camera a real-time template for facial features of the user present when the present user requests access to the access-restricted zone. The image processing device searches the user profiles stored in the database for a reference template that matches the real-time template to a specified degree, whereby a user profile is only searched if it is assigned to a present user based on a received identifier. If there is a match, the system grants access to the user and denies access in case of a mismatch.

Another aspect relates to a method of operating a system for controlling access to an access-restricted zone in a building or site. The system has a transmitting and receiving device, a memory device and an image processing device. The method includes receiving, by the transmitting and receiving device, a device-specific identifier of a mobile electronic device when the mobile electronic device is located in a public zone, from which a user may request access to the access-restricted zone. The received identifier of the mobile electronic device is stored in the memory device as belonging to a present user. The memory device has a database in which a plurality of user profiles of access-authorized users is created. The method also includes generating a real time template for facial features of the user present from a camera image of the user present produced by a camera of the image processing device when the user present requests access to the access-restricted zone. It also searches user profiles stored in the database for a reference template that matches the real-time template to a specified degree. If there is a match, the system grants the user access to the access-restricted zone and denies access in the case of a mismatch.

The technology described herein provides an access control system that does not require user manipulation of the mobile electronic device, especially not when the user is already at or near the access (for example, a door). A first phase of checking whether the user is access-authorized already takes place when the user is still relatively far away from access. For example, the user may be moving in the direction of access to the access-restricted zone during which, in one exemplary embodiment, the user's mobile electronic device is or has already been in communication with the transmitting and receiving device of the access control system. The transmitting and receiving device in this case receives the identifier of the mobile electronic device, which, if the user is registered as access-authorized, is assigned to a stored user profile. Alternatively, the transmitting and receiving device receives the identifier via a communication network. If the user then enters a detection area of a camera of the access control system, facial features of the user are ascertained from a camera image in a second phase. If the ascertained facial features match facial features stored in a user profile to a specified degree, the user is access-authorized and access is granted without the user having to manipulate the mobile electronic device. An authorized user is thus able to reach the access-restricted zone almost seamlessly.

A large number of users (for example, several hundred or thousand) may be authorized access to an access-restricted zone in a building or area; user profiles are created according to this number. Nevertheless, the technology described here has the advantage that the check for a match is carried out quickly, because not all user profiles of the access-authorized users need to be checked for a match, but only the user profiles of the users actually present. A user present is thus able to enter the access-restricted zone without significant interruption or delay. This reduces the risk, especially in the case of heavy traffic volume, of a queue forming in front of the access.

Not only does the technology provide a faster check, it may also be used in the case of high security demands because, for example, an authentication is carried out twice. On the one hand, two different channels are used: Radio for the transmission of an identifier and optical detection of a user's face. The identifier must belong to a registered user in the system, and the evaluation of the facial parameters must indicate a registered user. On the other hand, fewer user profiles need to be searched or checked, which reduces the frequency of errors (i.e., an access-authorized user is mistakenly denied access or a user who is not access-authorized is erroneously granted access).

Depending on traffic volume, a plurality of mobile electronic devices may be located in the public zone. In such a situation, the transmitting and receiving device receives a plurality of identifiers that are stored in the memory device, and for each stored identifier it may be ascertained whether the received identifier is assigned to a reference template in the database. If such assignments exist, it is checked whether the real-time template matches one of these reference templates; if there is a match, the system grants the user access to the access-restricted zone and, in the event of a mismatch, denies access to the user. The aforementioned advantage of the quick check is therefore also ensured in the case of high traffic volumes, since the check for a match is restricted to a limited (relatively small) set of user profiles.

On the one hand, the technology described here limits the check for a match to a limited set of user profiles. On the other hand, this limited set includes only access-authorized users, because it is only in the case of an access-correct user that the identifier of the mobile device is assigned to a stored user profile. For the image processing device, this means that relatively minimal demands are placed on an image processing algorithm implemented therein, for example, with respect to recognition accuracy. Compared to an image processing algorithm whose task is to identify a person with a high recognition accuracy based on a relatively high number of facial features (i.e., the degree of match must be relatively high, for example, greater than 90%), it is sufficient for the technology described herein to assign relatively few facial features to one of the access-authorized users. In addition, the degree of match may be set at between approximately 60% and approximately 90%, for example. A low cost image processing algorithm may therefore be used; however, the safety requirements may nevertheless be ensured.

In one exemplary embodiment, checking for a match includes generating a result signal. If there is a match, it indicates that the user has access to the access-restricted zone, while in case of a mismatch it indicates that the user does not have access to the access-restricted zone. As a function of the result signal, a control signal in one exemplary embodiment may be generated to release a (physical) barrier (for example, barrier, door, or turnstile). An unreleased barrier remains blocked. In another exemplary embodiment, the control signal activates an information device in the case of an access denial. The information device may be used, for example, in connection with an access without a physical barrier. If an unauthorized user is recognized at the access, the information device in one case may generate an alarm, which is perceptible at the access (acoustically and/or visually). In another case, the control signal may alert a security service, which then checks the user who has been recognized as not access-authorized.

In one exemplary embodiment, the radio connection takes place between the transmitting and receiving device and a mobile electronic device of a user in accordance with a Bluetooth standard or a WLAN/WiFi standard. This is advantageous, because commercially available mobile phones or smartphones are already equipped with technology according to one of these standards, and thus no special devices are needed.

The technology described here also allows flexibility in terms of the identifier of a mobile device. The identifier of a mobile device may include, for example, a device identification number permanently assigned to the device or a telephone number assigned to the mobile device. In one exemplary embodiment, each mobile device is equipped with application-specific software that generates a unique and time-invariable identifier for the mobile device. The identifier (whether it includes a device identification number or a telephone number or is generated by software) enables the unique identification of a mobile device.

In one exemplary embodiment, the image processing device has a modular structure; an image processing module generates the real-time template from a camera image, and an evaluation module connected to the image processing module and the memory device generates a result signal indicating whether the real-time template matches this reference template. Such a modularity allows efficient adaptation of the modules to different requirements (for example, implementation of a cost-effective image processing algorithm in the evaluation module).

Modularity in one exemplary embodiment is also given with respect to a processor connected to the image processing device. As a function of the result signal, the processor generates a control signal to control the access control system to grant or deny access to the user.

In the technology described here, it is an advantage that its application is not limited to the way access to the access-restricted zone is designed. The access may be a physical barrier, for example, a barrier, a door, a revolving door or a turnstile, which is either released or remains blocked. Alternatively, the access may be designed without such a physical barrier (i.e., as a substantially barrier-free access). If an unauthorized user is detected at the access (with or without a physical barrier) using the technology described here, an alarm may be generated and/or a security service may be alerted.

In one exemplary embodiment, the technology described herein may be used in conjunction with an elevator system. For example, a destination floor can be defined for each access-authorized user, on which, for example, his workplace or his apartment is located. With each grant of access, a destination call may be generated for the user in question, whereupon an elevator control of the elevator system moves an elevator car first to a boarding floor and then to a destination floor. This improves the user-friendliness because the user is able to directly approach an assigned elevator car without having to input an elevator call him/herself.

BRIEF DESCRIPTION OF THE DRAWINGS

Various aspects of the improved technology are described in greater detail below on the basis of exemplary embodiments in conjunction with the drawings. In the figures the same elements have the same reference numerals. In the figures.

DETAILED DESCRIPTION OF EMBODIMENTS OF THE INVENTION

Figure 1:
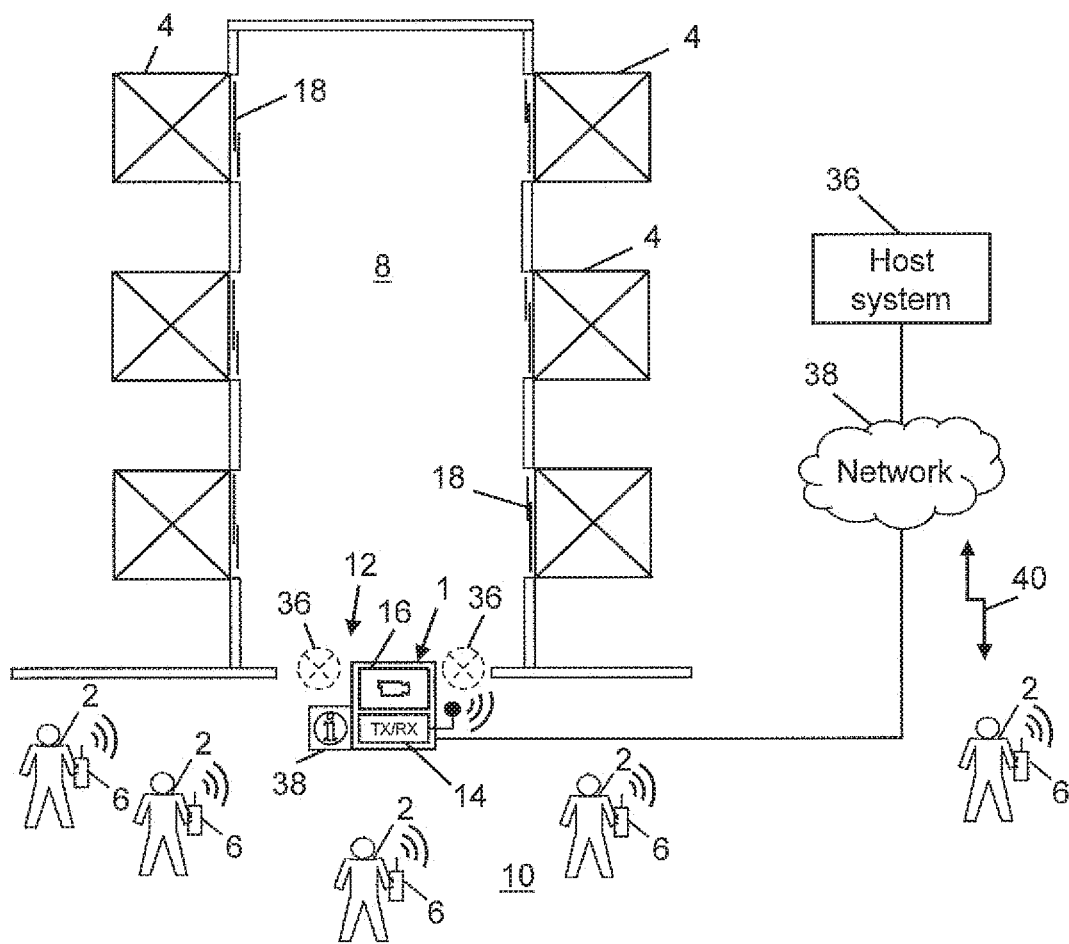
FIG. 1 shows a schematic representation of an application example of an access control system in connection with a building.

FIG. 1 is a schematic representation of an application example of an access control system 1 in connection with a situation in a building, of which only a few walls, rooms 4 and zones 8, 10 are shown for purposes of illustration. The rooms 4 may be, for example, offices, apartments, halls and/or elevator cars of an elevator system. In the application of the access control system 1 shown in FIG. 1, multiple users 2 carrying mobile electronic devices 6 (also referred to below as mobile device 6) are located in the zone 10. Zone 10 is not subject to access restriction in this example and is also referred to below as public zone 10. The public zone 10 may be an area inside or outside the building. An access 12 separates the public zone 10 from the zone 8, which is subject to an access restriction and adjoins the rooms 4. Those skilled in the art will recognize that the access control system 1 is not limited to applications within a building, but may be used in an analogous manner to control access to an access-restricted zone on a site. The term "building" in this description is understood to mean, for example, residential buildings, commercial buildings, sports arenas, shopping centers, but also ships.

The access control system 1 monitors the access 12 so that only authorized users 2 are able to enter the zone 8, for example, by blocking or releasing a door, a barrier, a turnstile, or other physical barrier, by activating an information device 38 in the case of access without a physical barrier, if an unauthorized user 2 is detected, or by combining these measures. The information device 38 may, for example, trigger a visual and/or audible alarm or initiate a notification of a security service. In FIG. 1, the access control system 1 is delineated as being situated in the access 12 for illustration purposes; in addition, a turnstile 36 is indicated as an exemplary physical barrier. However, those skilled in the art recognize that in a specific implementation, the access control system 1 or its components may be arranged in different ways.

In another exemplary embodiment, the access control system 1 is situated at an access 18 to at least one room 4, possibly at each access 18. Depending on the nature of the room 4, the access 18 comprises, for example, an office door, a story door, an apartment door or an elevator door, each of which then represents a physical barrier. In this exemplary embodiment, each room 4 corresponds to an access-restricted zone 8, and the area in front of an access 18 corresponds to the public zone 10. The access control system 1 unlocks, for example, an electronic lock of an office door or apartment door. In an elevator-related application, the access control system 1 may, for example, prevent the departure of an elevator car when an unauthorized user 2 enters or wishes to enter the car.

Figure 2:
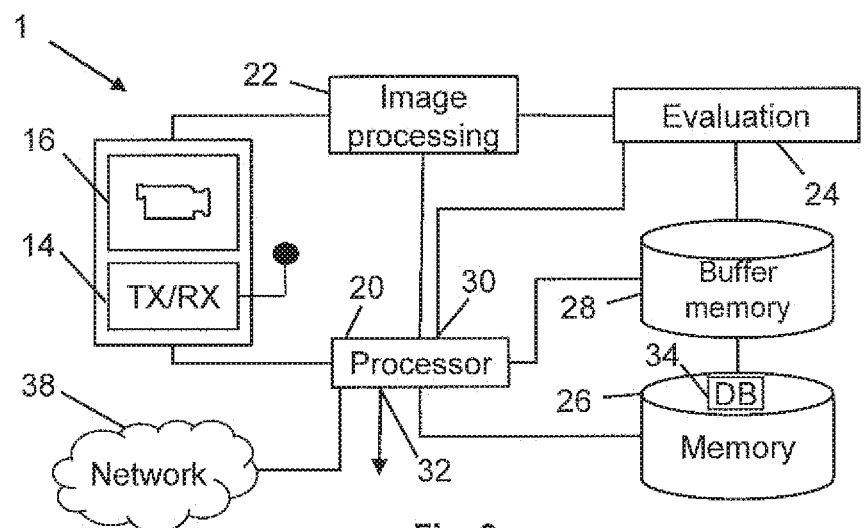
FIG. 2 shows a schematic representation of an exemplary embodiment of an access control system.

As indicated in FIG. 1, the access control system 1 comprises a transmitting and receiving device 14 (illustrated as TX/RX in FIG. 1) and a camera 16 as part of an image processing device; additional components of the access control system 1 are shown in FIG. 2. In one exemplary embodiment described here, the transmitting and receiving device is designed to receive radio signals, and is therefore also referred to below as transceiver 14. The transceiver 14 communicates with the mobile electronic devices 6 when they are located within radio range of the transceiver 14, i.e., a radio signal emitted by a mobile device 6 has a signal strength at the location of the transceiver 14 (expressed by an RSSI value (Received Signal Strength Indicator)), which is greater than a threshold specified for safe reception. The communication takes place, for example, via a near-field radio network such as a Bluetooth radio network, WLAN/WiFi or a ZigBee radio network. Bluetooth is a standard in accordance with IEEE 802.15.1, WLAN/WiFi is a standard in accordance with IEEE 802.11, Zig-Bee is a standard in accordance with IEEE 802.15.4; such radio networks in accordance with these standards are used for the wireless networking of devices over a short distance of approximately a few meters to approximately one hundred meters. The radio network forms the interface via which the mobile electronic device 6 and the transceiver 14 are able to communicate with each other.

In another exemplary embodiment, the transmitting and receiving device 14 is communicatively coupled to a communication network 38. The transmitting and receiving device 14 in this exemplary embodiment is able to receive the device-specific identifier of a mobile device 6 via the communication network 38. The mobile device 6 is able to determine its current location by means of a positioning function installed thereon, for example, based on GPS (Global Positioning System). The mobile device 6 is able to transmit the location, together with its identifier, to the transmitting and receiving device 14 by means of an internet connection (including the communication network 38) formed via a mobile radio system (for example, 4G) and possibly an application-specific software.

Exemplary embodiments of the technology will be described below with reference to the transceiver 14. As described above, the transceiver 14 receives an identifier transmitted from a mobile electronic device 6 by means of a (near-field) radio communication.

The camera 16 generates a camera image of a user 2 (in particular, the user's face), which is located in the detection area of the camera 16, when the user 2 wishes to enter the access-restricted zone 8 at the access 12. In one exemplary embodiment, the camera 16 generates a digital camera image (also referred to as a digital image). The transceiver 14 and the camera 16 (including other components of the image processing device) may be situated in a housing, which is situated, for example, in the access 12 as shown in FIG. 1. Alternatively, the transceiver 14 and the camera 16 (including other components of the image processing device) may also be situated separately from one another as separate units, for example, spatially separated from one another in an area around the access 12, with the camera 16 being situated so that only the user 2 is detected, who actually desires access.

In the situation shown in FIG. 1, the technology described here may be advantageously used to operate the access control system 1 with as little complexity as possible, and to grant the user 2 convenient access to the access-restricted zone 8. Summarized briefly and by way of example, the access control system 1 according to one exemplary embodiment is operated as follows: Once a user 2 is within radio range of the transceiver 14, his/her mobile device 6 automatically communicates with the transceiver 14 and the mobile device 6 sends its identifier to the transceiver 14. In the situation according to FIG. 1, the transceiver 14 receives a plurality of identifiers. The access system 1 therefore "knows" how many mobile devices 6 are located within radio range at a particular point in time and, if their users are 2 registered users 2, to which users 2 the mobile devices 6 belong. These users 2 may be combined to form a group of users 2 present. If one of the users 2 present now wishes to access the access-restricted zone 8, the access control system 1 ascertains a dataset with facial features of this user 2 as part of an image processing and of a facial recognition process and compares this ascertained dataset with stored (facial feature) datasets assigned to the users 2 present. This comparison is therefore limited to the group of users 2 present; thus, only datasets of this group are searched to see whether the ascertained dataset matches one of the stored datasets. The facial recognition process is faster, since not all datasets created in the access control system 1 need to be searched, and it can be decided more quickly whether the user 2 is access-authorized or not.

FIG. 1 also shows the communication network 38, which in one exemplary embodiment is communicatively connected to a host system 36 and to the access control system 1. It is also indicated that a user 2 may communicate via the communication network 38 by means of a communication link 40, for example, with the host system 36 or with a web portal. Exemplary functions of the communication network 38 and of the host system 36 are described in connection with FIG. 4.

FIG. 2 shows a schematic illustration of one exemplary embodiment of the access control system 1. In one exemplary embodiment, the access control system 1 has a modular structure and comprises an image processing device which, in addition to the camera 16, comprises an image processing module 22 (image processing in FIG. 2) and an evaluation module 24 (evaluation in FIG. 2). In addition to the transceiver 14, the access control system 1 also comprises a processor 20, a memory device 26 (memory in FIG. 2) and a buffer device 28 (buffer memory in FIG. 2). Those skilled in the art recognize that at least one of the memory devices 26, 28 may also be assigned to the image processing device, or that the function of the buffer device 28 may be performed by the memory device 26 and thus the buffer device 28 may be omitted in one exemplary embodiment. The processor 20 has an output 32 for a control signal and an input 30 for a result signal generated by the evaluation module 24. As a function of the result signal, the processor 20 controls the access control system 1 so that the user 2 is granted or denied access. If, for example, a physical barrier (for example, turnstile 36 in FIG. 1) separates the zones 8, 10, the control signal releases or blocks the barrier. On the other hand, if the zone separation occurs without a physical barrier, in the case of an unauthorized user 2, the control signal activates, for example, the information device 38 to generate an alarm or alerts a security service. The information device 38 may also be activated to indicate to the user 2 or to a security service in connection with a barrier, that the barrier has been released or blocked.

The camera 16 in one exemplary embodiment comprises a digital camera having selectable and/or adjustable properties; camera images are thus present in this exemplary embodiment as digital datasets. The properties of the digital camera, for example resolution (for example, indicated in megapixels), exposure and focal length, are selected or set so that a camera image (digital image) may be evaluated and the user's face 2 may be recognized in evaluable quality on the digital image. A digital image is, for example, in the JPEG format, but it can also be in a different format, for example, in the BMP format or in the JPEG2000 format. The camera 16 may be equipped with a sensor module or may be connected to a separate sensor module, which activates the camera 16 when it detects the presence of a user 2 in the detection area of the camera 16. The sensor module may comprise, for example, a proximity sensor, which may be designed as an ultrasonic sensor, an infrared sensor or an optical sensor (for example, light barrier, brightness sensor). Alternatively, the presence of a user 2 in the detection area of the camera 16 may be recognized in one exemplary embodiment by detecting changes in the detection area. If, for example, the user 2 enters the detection area and the camera 16 is always in an active state, the camera 16 records changes in front of an essentially static background; these changes are interpreted as presence.

The evaluation module 24 is shown for purposes of illustration as a separate unit, which is connected to the image processing module 22, to the processor 20 and to the buffer device 28. In one exemplary embodiment, the evaluation module 24 and the image processing module form a unit. The memory devices 26, 28 are also shown as separate units for purposes of illustration; depending on the design, they may be combined in a memory device, where they occupy, for example, separate memory areas. Regardless, the memory devices 26, 28 may include, for example, a hard disk drive (HDD) or CD/DVD drive, a semiconductor drive/solid state disk (SSD), or combinations thereof, or other digital data memory devices.

The aforementioned unit made up of evaluation module 24 and image processing module 22 comprises at least one processor unit, which executes a computer-aided method for image processing. Image processing methods are known, for example from U.S. Pat. No. 8,494,231 B2. A basic representation of the image processing for the purpose of facial recognition is described in the publication "Gesichtserkennung" ["Facial Recognition"] of the German Federal Office for Information Security (available under the topic of biometrics under the Internet address www.bsi.bund.de). This publication distinguishes between the three main steps "Create template", "Create reference dataset" and "Compare facial images". In order to keep the comparison of two facial images as simple and fast as possible, the features of a face are ascertained and stored in the form of a feature dataset referred to as a "template". When the face on an image of a user has been found and standardized, features in addition to the eyes, nose, and mouth/chin are sought, measured, and related to each other. These extracted features are encoded, compressed and stored as a feature dataset (template). The similarity of the templates of two facial images are defined by combining them using a mathematical algorithm. This results in a degree of similarity of the templates. If the result is within certain tolerance limits, the two templates, and thus their underlying facial images, are classified as identical.

According to the technology described here, a template is generated for each user 2 when registering as an access-authorized user and stored in a user profile of the user 2. The template may be generated from a digital image showing the face of user 2. This template is referred to below as a reference template. It is advantageous if, during the registration, the user's face 2 is exposed to similar lighting conditions as locally in the vicinity of the camera 16. This facilitates the comparison of templates, i.e., the comparison of the reference template with a real-time template, which is generated when a user 2 desires access to the access-restricted zone 8.

In the situation shown in FIG. 1, several users 2 are lingering in the public zone 10; some may desire access to the access-restricted zone 8, some may be coming from zone 8 on the way to a building exit and others in turn may be on their way to another part of the building. This means in the situation shown that not every user 2 lingering in the public zone 10 actually wishes to enter the zone 8. From the perspective of the access control system 1, however, all users 2 present are potential users 2 who may sooner or later desire access.

The access control system 1 ascertains the users 2 present with the aid of the communication between the mobile devices 6 and the transceiver 14. In each mobile device 6, a radio module, for example a Bluetooth module, is activated in order to be able to communicate with the transceiver 14 as soon as it is located within radio range of the transceiver 14. Depending on the design of the mobile device 6 and its radio module, an application-specific software application (also referred to as an app) may also be activated. The application specific software application is used in one exemplary embodiment in connection with access control and with the use of elevators. In one exemplary embodiment, the application specific software also generates a unique and time-invariable identifier for the mobile device. Such a software-generated identifier is an alternative to the above-mentioned device identification number and to a telephone number.

During communication, the mobile device 6 sends its identifier to the transceiver 14; the access control system 1 thus updates a database in which the identifiers of all mobile devices 6 currently present are stored. These may be mobile devices 6, whose users 2 are registered as access-authorized users 2 in the access control system 1, as well as mobile devices 6 whose users 2 are not registered. In one exemplary embodiment, the database storing the identities of the users 2 present is located in the buffer 28.

For each registered user 2, a user profile is created in the access control system 1, i.e., it is stored as a dataset in a database 34. The database 34 in one exemplary embodiment is set up in the memory device 26. The user profile includes personal data of the user 2 (for example, name, reason for authorization (resident, employee, external service provider) and facial features in the form of a template), access authorizations (for example, specific rooms 4 and floors) and possibly temporal access restrictions (for example, access from Monday to Friday, from 7:00 am to 8:00 pm). In the user profile, the user 2 is also assigned at least one mobile device 6. As an alternative to creating the user profile in the access control system 1, the user profile may be created in a database of a building management system, wherein the access control system 1 may access this database by means of a communication network.

If one of the users 2 present desires access to the access-restricted zone 8, he/she moves in the public zone 10, for example, coming from a building main entrance, in the direction of the access 12. If the user 2 arrives in a detection area of the camera 16 situated there, the camera 16 generates one or multiple digital images or a video recording, each of which is available as a digital dataset and is stored temporarily for further processing. The image processing module 22 ascertains the real-time template from the dataset, as discussed elsewhere in this description.

If the real-time template has been ascertained, the evaluation module 24 starts a search algorithm in order to check whether the ascertained real-time template may be assigned to a registered user 2. Instead of searching all stored user profiles in the memory device 26, the search algorithm searches only the user profiles of the users 2 present. The group of users 2 present is stored in the buffer 28 as described above. If the ascertained facial features match the facial features stored in the user profile of the user 2 to a specified degree, the evaluation module 24 generates a result signal, which indicates that the user 2 is access-authorized. If, on the other hand, there is no such match, the result signal generated by the evaluation module 24 indicates that the user 2 is not access-authorized.

The mobile device 6 may be, for example, a mobile phone, a smartphone, a tablet PC or a smartwatch, these devices usually being equipped with hardware that enables communication via a near-field radio network. However, the mobile device 6 may also be miniature computer goggles or another body-worn computer-aided device (also referred to as a "wearable device") when these devices are intended for near field communication. Depending on the design of the mobile device 6, it may, for example, have a graphical user interface (also referred to as Graphical User Interface, GUI) in order to be able to selectively activate and deactivate the mobile device 6 and its functions.

With the understanding of the basic system components and their functionalities described above, a description of an exemplary access control method will be provided below in connection with FIG. 3 as one aspect of a method of operating the access control system 1 (another aspect is a registration method described in connection with FIG. 4 for a visitor). The description is made with reference to a user 2 who wishes to enter the access-restricted zone 8 at the entrance 12, for example, to use an elevator there. The user 2 carries the mobile device 2 with him/her and has activated the radio module (for example, for Bluetooth communication) and possibly an associated software application. The method begins with a step S1 and ends with a step S10.

If the user 2 is located with his/her mobile device 6 in the public zone 10 and within the radio range of the transceiver 14, the transceiver 14 receives in a step S2 an identifier emitted by the mobile device 6. The transceiver 14 and the mobile device 6 communicate according to the same communication standard, in this exemplary embodiment via a Bluetooth radio link. The received identifier is stored in a step S3; for example, in the buffer device 28.

Steps S2 and S3 are executed for each mobile device 6 that is located within radio range of the transceiver 14, and operates according to the same communication standard as the transceiver 14. Depending on the number of users 2 in the public zone 10, a plurality of identifiers, corresponding to a group of users 2 present, may be stored in the buffer device 28 at a particular point in time. Those skilled in the art will recognize that the buffer device 28 is updated when a mobile device 6 is no longer within radio range, for example, because the associated user 2 has left the public zone 10 without desiring access to the access-restricted zone 8 or because the associated user 2 has already entered the access-restricted zone 8. The buffer device 28 thus stores the identifiers of the mobile devices 6 whose users 2 are present in the public zone 10 at a particular point in time.

In a step S4 it is ascertained whether one of the users 2 present desires access to the access-restricted zone 8. The access control system 1 recognizes this desire according to one exemplary embodiment with the aid of the aforementioned sensor module or with the aid of the detection of background changes. For example, the sensor module detects when the user 2 enters the detection area of the camera 16, whereupon the camera 16 is activated. If an access request is recognized, the process proceeds along the Yes branch to a step S5. Otherwise, the process remains in a loop along the No branch.

In step S5, the activated camera 16 generates a digital image, which reproduces at least the face of the detected user 2, and the image processing module generates a real-time template from the digital image, as discussed elsewhere in this description.

In a step S6, each user profile assigned to a received identifier is searched in the database 34 by means of the real-time template ascertained in step S5. A user profile is only searched if it is assigned to a user 2 present based on a received identifier. If a registered user 2 requests access, a user profile exists in the database 34 for this user 2 in which the identifier of the mobile device 6 is stored. If the user 2 requesting access is not a registered user 2, the identifier of the mobile device 6 is not assigned a user profile.

When searching according to step S6, it is checked in a step S7 whether the real-time template matches a reference template to a specified degree. In one exemplary embodiment, the real-time template and the reference templates each comprise a specified number of specified facial parameters and their values (for example, eye distance, mouth width, distance between lip top edge and lip bottom edge, distance between nose and lip bottom edge, etc.). During the search, the parameter values of the real-time template are compared with the parameter values of the reference templates. There is a match when the degree of similarity of the templates is at least equal to the specified degree. The specified degree indicates a percentage match of the facial parameters of the real-time template with the facial parameters of a reference template. Depending on the accuracy requirement, the specified degree may be selected, for example, between approximately 60% and approximately 90%.

If there is a match, the process advances along the Yes branch to a step S9 in which the user 2 is granted access. If, on the other hand, there is no match, the process advances along the No branch to a step S8 and the user 2 is denied access.

Figure 3:
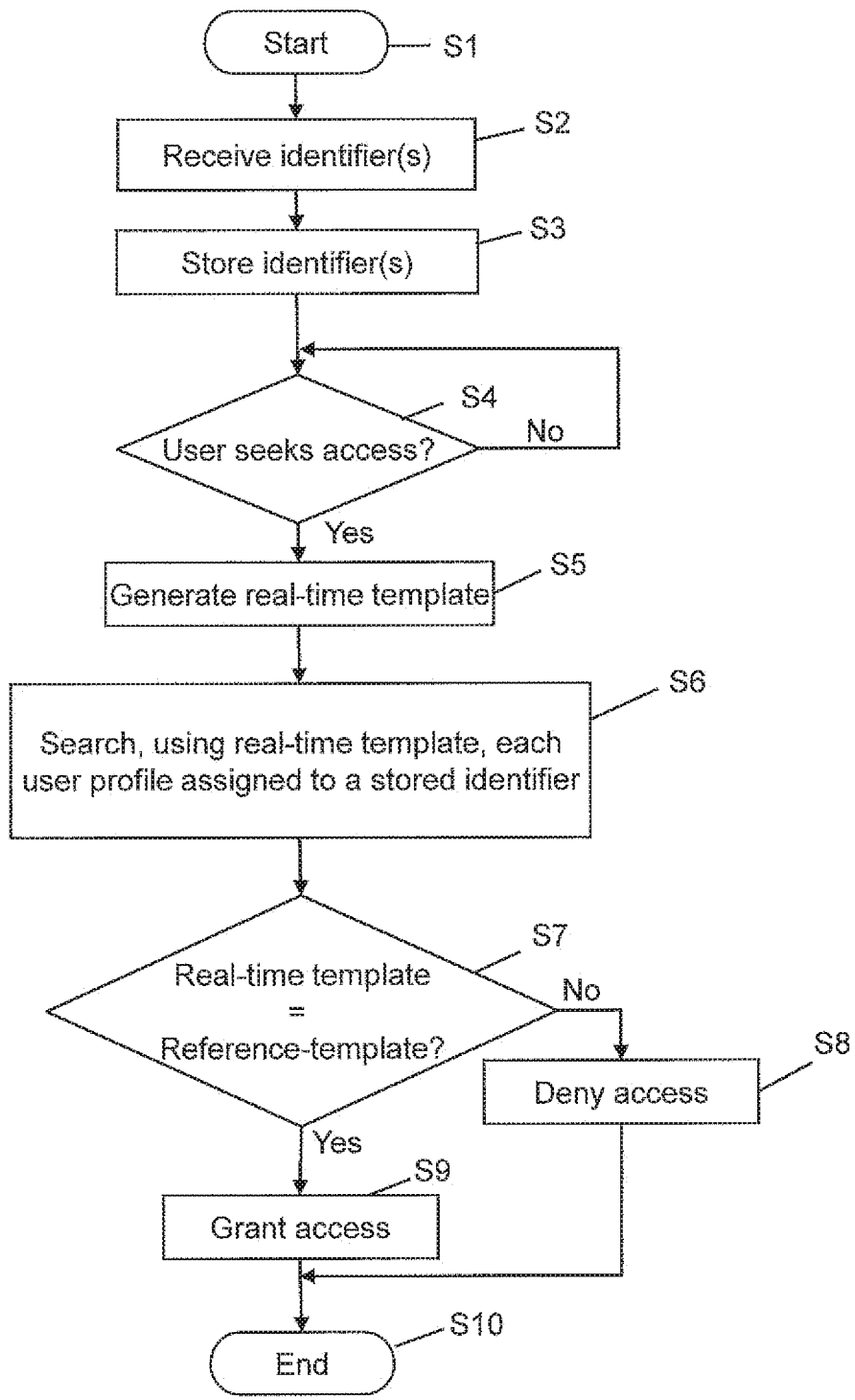
FIG. 3 shows a flow chart of an exemplary embodiment of an access control method as one aspect of a method for operating the access control system.
Figure 4:
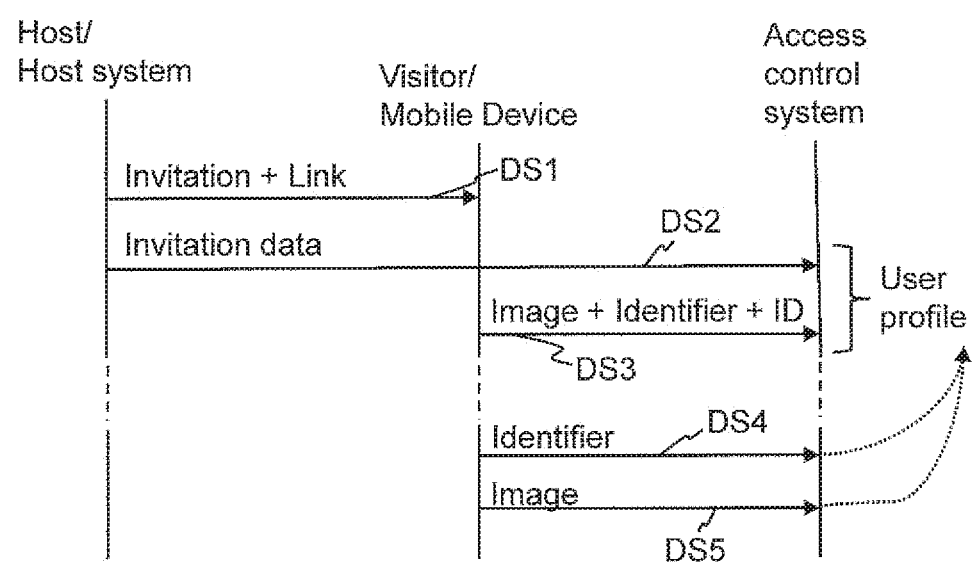
FIG. 4 shows an exemplary signal diagram for illustrating an exemplary embodiment of a visitor registration method as one aspect of a method for operating the access control system.

From the description provided in connection with FIG. 3 of an exemplary method for operating the access control system 1, it is apparent that a user 2 does not have to manipulate his mobile device 6 in order to gain access to the access-restricted zone 8. Depending on the design of the access, i.e., with or without a physical barrier, the control of the access authorization may take place without the user 2 taking notice.

In one exemplary embodiment, the access control system 1 is connected to an elevator system, in particular, to an elevator controller. The communication between the access control system 1 and the elevator control may take place via the network 38. For example, if the access control takes place in the entrance hall of the building through which users 2 must pass in order to access the elevators, a destination call may be initiated with each access granted to the user 2 in question. The elevator control of the elevator system processes the destination call and assigns it an elevator. The elevator assigned to the destination call may be displayed to the user 2, for example, by a terminal at the access 12 and/or may be communicated by voice. The user 2 may thus go directly to the assigned elevator without having to enter an elevator call.

In the description provided in conjunction with FIG. 3, each user 2 in the access control system number 1 is registered as an access-authorized user 2. Depending on the type of building, unregistered users 2, for example, visitors, may also desire access to the access-restricted zone 8. FIG. 4 shows a signal diagram of one exemplary embodiment of a method which makes it possible to conveniently grant visitors access to the access-restricted zone 8. In order to illustrate an exemplary scenario, FIG. 4 schematically shows interactions between a host or a host system 36 used by him/her, a visitor or his/her mobile device 6 and the access control system 1, in order to register the visitor in the control system 1 by means of a registration process. Thus, according to the technology described herein, the visitor is also a user 2 (reference numeral 2 will be used hereinafter for both the visitor and one or multiple users).

In this scenario, the host and visitor 2 agree on an appointment, i.e., a date and time or period when the host expects visitor 2. The host then generates an invitation, for example, with the host system (for example, PC, notebook, tablet PC, smartphone or with another electronic device) and a software application installed thereon (for example, with the aid of Outlook or similar application programs) and sends it to the visitor 2, for example, via the communication network 38 and the communication link 40. The communication link 40 may be made, for example, via a mobile radio communication system.

In addition to the appointment details, the invitation comprises an identification number assigned to the invitation (referred to as "ID" in FIG. 4) and also information about a communication channel which the visitor 2 has to use for communication with the access control system 1 for the purpose of registration. In one exemplary embodiment, the communication channel is the Internet; the communication channel information therefore includes an Internet address for a web portal (referred to as "link" in FIG. 4). For example, the Internet address may include a Uniform Resource Locator (URL) that identifies and localizes the Web portal as a resource regarding the access method to be used (for example, a used network protocol such as HTTP or FTP) and the location of the resource on a computer network. The web portal is assigned to a computer system of the access control system 1. The transmission of the invitation takes place in one exemplary embodiment via the communication network 38 by means of a signal DS1; it may be done, for example, as a text message to the mobile device 6 of the visitor 2 or as an e-mail to the e-mail address of the visitor 2.

The host or host system 36 also sends the data of the invitation by means of a signal DS2 to the access control system 1, for example, via the communication network 38 and for sending the invitation essentially simultaneously or at a later point in time. The access control system 1 creates a visitor profile under the control of the received invitation data processor 20. In addition to the appointment information, the invitation data in one exemplary embodiment also include information about the host, for example, name, telephone number, floor and/or apartment number or office number. In addition, a time window may be specified, within which the visitor 2 is to be granted access. The time window may indicate, for example, that the visitor 2 has access approximately half an hour before and after the beginning of the appointment, in case the visitor 2 arrives too early or is delayed. The visitor profile may be deleted after the arrival of the visitor 2 or at a later point in time.

The invitation invites the visitor 2 to send a digital image, on which the face of the visitor 2 may be seen, to the access control system 1 via the specified communication channel, for example, comprising the web portal. For example, the visitor 2 may take a current self-portrait (also known as a "selfie") with the camera of his mobile device 6 and upload it via the web portal. In another embodiment, the visitor 2 may also upload a stored digital image recorded at an earlier point in time. One advantage of the technology described herein is that the visitor 2 may upload the digital image at a point in time he/she chooses, as long as it is before the appointment. The visitor 2 in this case may be geographically far away from the building or located already in or near the building.

In connection with the uploading of the digital image, a transmission of the identification number of the invitation also takes place, so that the access control system 1 may uniquely assign the received digital image to the invitation. Depending on the design, the visitor may be invited to input the identifier of the mobile device 6 (for example, telephone number or device identification number). If the visitor uploads the digital image by means of the mobile device 6, the identifier of the mobile device 6 in one exemplary embodiment is also transmitted, for example, automatically, to the access control system 1. An application-specific software application, if it is installed on the mobile device 6 as described above, assists the visitor 2 in uploading the digital image. The digital image, the identifier and the identification number of the invitation are transmitted by means of a signal DS3, for example, via the communication network 38 and the communication link 40*th*. The signal DS3 may be transmitted in accordance with a known transmission protocol, for example, TCP (Transmission Control Protocol), IP (Internet Protocol) and UDP (User Data Protocol). The access control system 1 stores the received data (digital image, identifier and identification number of the invitation) in the visitor profile.

The technology described here may also utilize other communication channels. As an alternative to utilizing a web portal, the invitation may invite the visitor 2 to transmit the digital image, the identifier and the identification number of the invitation to a building management. The building management may manage, for example, for the building in question, the database 34 in which the user profiles of the access-authorized users 2 are stored. The transmission to the building management may take place, for example, to an e-mail address specified in the invitation of the building management or telephone number of the building management, for example, for an SMS or MMS message. Personnel of the building management may then arrange the further processing of the received data.

In one exemplary embodiment, the processor 20 shown in FIG. 2 controls the reception and further processing of the digital image, the identifier, and the identification number of the invitation. The access control system 1 generates a reference template with the aid of the image processing device 22 from the digital image of the visitor 2, as described in connection with FIG. 2, and stores the reference template in the visitor profile. Thus, according to one embodiment, the visitor profile is complete for the purpose of access control, and the registration process by which the visitor 2 is registered in the access control system 1 is completed. The reference template and the invitation data may be read by accessing the visitor profile, for example, by means of the identifier of the mobile device 6 of the visitor 2.

After the visitor profile has been created, the visitor 2 may be granted access in accordance with the access control procedure described in connection with FIG. 3 if he/she appears in the building at the agreed time. As soon as the visitor arrives in the public zone 10 in the reception area of the transceiver 14, the transceiver 14 receives the identifier emitted by the mobile device 6. The identifier of the mobile device 6 is received as described above and is represented in FIG. 4 by means of a signal DS4. When the visitor subsequently enters the detection area of the camera 16, the camera 16 generates a digital image showing the visitor's face. The generation of the digital image by the camera 16 and the subsequent generation of a real-time template take place as described above; in FIG. 4 this is represented by a signal DS 5.

The access control system 1 checks whether the real-time template matches the reference template to the specified degree. The access control system 1 also checks whether the visitor requests access within the time window specified in the visitor profile. If both conditions are met, the visitor is granted access.

In one exemplary embodiment, the access control system 1 generates and sends a message to the host informing the host that the visitor has been granted access. The host may thus prepare promptly for the appearance of the visitor.

Depending on the design of the building, the access control system 1 may communicate with an elevator control in order to generate a destination call for the visitor 2 when the access is granted. The elevator controller assigns an elevator to the destination call, whereby the assigned elevator may be communicated to the visitor 2 in the area of the access 12 by display or voice. The assigned elevator transports the visitor 2 to the floor where the host is located. The host's floor is stored, for example, in the visitor profile in connection with the invitation data. The visitor 2, especially if he/she is building for the first time, therefore need not deal with the input of the destination floor. The visitor 2 may also be provided more information to better orient him/herself in the building, for example, the visitor 2 may be advised in which direction (possibly also how far) he/she should go after getting off at the floor. The notification of such routing information may be done for example by means of the mobile device 6 of the visitor 2 and/or displays on the floors or in the elevator car.

The invention claimed is:

1. A method for operating a system for controlling access to an access-restricted zone in a building or a site, the system comprising a transmitting and receiving device, a memory device, a processor and an image processing device, the method comprising:

for each user present in a public zone from which a user may request access to the access-restricted zone, receiving a device-specific identifier of a user's mobile electronic device by the transmitting and receiving device when the user's mobile electronic device is located in the public zone;

storing the received identifier of each mobile electronic device in the memory device as belonging to a present user, the memory device including a database in which a plurality of user profiles of access-authorized users is stored, each user profile including a reference template of facial features for each respective user;

generating a real-time template for facial features of a first present user from a camera image of the first present user produced by a camera of the image processing device, if a presence of the first present user is recognized in a detection area of the camera when the first present user requests access to the access-restricted zone, wherein the real-time template is generated by the image processing device; and searching user profiles stored in the database including reference templates, wherein the user profiles are searched only if the user profiles are assigned to present users in the public zone whose received identifiers are stored in the memory device, comparing the real-time template to one of the reference templates to a selected degree of similarity of facial features, wherein, in case of a match, the system grants the first present user access to the access-restricted zone and denies access when there is no match.

2. The method of claim 1, wherein when a plurality of mobile electronic devices are located in the public zone:
a plurality of received identifiers of the respective plurality of mobile electronic devices located in the public zone, are stored in the memory device,
determining those identifiers assigned to a user profile having a reference template; and,
checking to see whether the real-time template matches one of the reference templates of the determined identifiers, to a selected degree of similarity of facial features, wherein if the match is found, the system grants the first present user access to the access-restricted zone and denies access when there is no match.

3. The method of claim 1, further comprising:
generating a result signal indicating in the case of the match, that the first present user has access to the access-restricted zone and, when there is no match, indicating that the first present user has no access to the access-restricted zone.

4. The method of claim 3, further comprising:
generating a control signal as a function of the result signal, in order to release a barrier.

5. The method of claim 3, further comprising:
generating a control signal as a function of the result signal, in order to activate an information device if access is denied.

6. The method of claim 1, wherein the transmitting and receiving device communicates with a mobile electronic device by a radio link, wherein the radio link between the transmitting and receiving device and the mobile electronic device of a user takes place in accordance with a Bluetooth standard or a Wireless Local Area Network (WLAN) standard, and wherein the transmitting and receiving device receives the device-specific identifier via the radio link when the mobile electronic device is located within radio range of the transmitting and receiving device.

7. The method of claim 1, wherein the transmitting and receiving device receives the device-specific identifier by a communication network.

8. The method of claim 1, wherein the identifier is generated by an application-specific software, which is active on the mobile electronic device, the identifier being time-invariable.

9. The method of claim 1, in which the identifier comprises a device identification number or a telephone number assigned to the mobile electronic device.

10. The method of claim 1, wherein the real-time template and the reference templates each comprise a specified number of specified facial parameters, and in which the specified degree is between 60% and 90%, the specified degree indicating a percentage match of the facial parameters of the real-time template with the facial parameters of the reference templates.

11. The method of claim 1, further comprising:
generating a destination call for an elevator system when the first present user is granted access.

12. A system for controlling access to an access-restricted zone in a building or site, the system comprising:
a transmitting and receiving device, which is operable to receive for each user present in a public zone from which a user may request access to the access-restricted zone, a device-specific identifier of a user's mobile electronic device;
a memory device, which is operable to store the identifier of each mobile electronic device received by the transmitting and receiving device as belonging to a user present in the public zone, and which includes a database in which a plurality of user profiles of access-authorized users are stored, each user profile including a reference template of facial features for each respective user; and
an image processing device,
which is operable to generate from a camera image produced by a camera a real-time template for facial features of a first present user when the present user requests access to the access-restricted zone,
which is operable to search the user profiles stored in the database including reference templates, wherein the user profiles are searched only if the user profiles are assigned to present users in the public zone whose received identifiers are stored in the memory device, compare the real-time template to one of the reference templates to a selected degree of similarity of facial features, wherein in the case of a match, the system grants the first present user access and denies access when there is no match.

13. The system of claim 12, wherein the image processing device comprises an image processing module, which is operable to generate the real-time template from the camera recording, and an evaluation module, which is connected to the image processing module and to the memory device, wherein the evaluation module is operable to generate a result signal indicating whether the real-time template matches one of the reference templates.

14. The system of claim 13, further comprising:
a processor, which is connected to the image processing means and which is operable to generate a control signal as a function of the result signal in order to control the access control system so that the first present user is granted or denied access.

15. The system of claim 14, further comprising:
a barrier, which is released or blocked as a function of the control signal.

16. The system of claim 14, further comprising:
an information device which is activated if access is denied.

17. The system of claim 12, in which the radio connection between the transmitting and receiving device is designed for a communication in accordance with a Bluetooth standard or a Wireless Local Area Network (WLAN) standard.

* * * * *